July 29, 1924.
E. H. TOOLEY
POWDER DISPENSER
Filed April 21, 1921
1,502,698
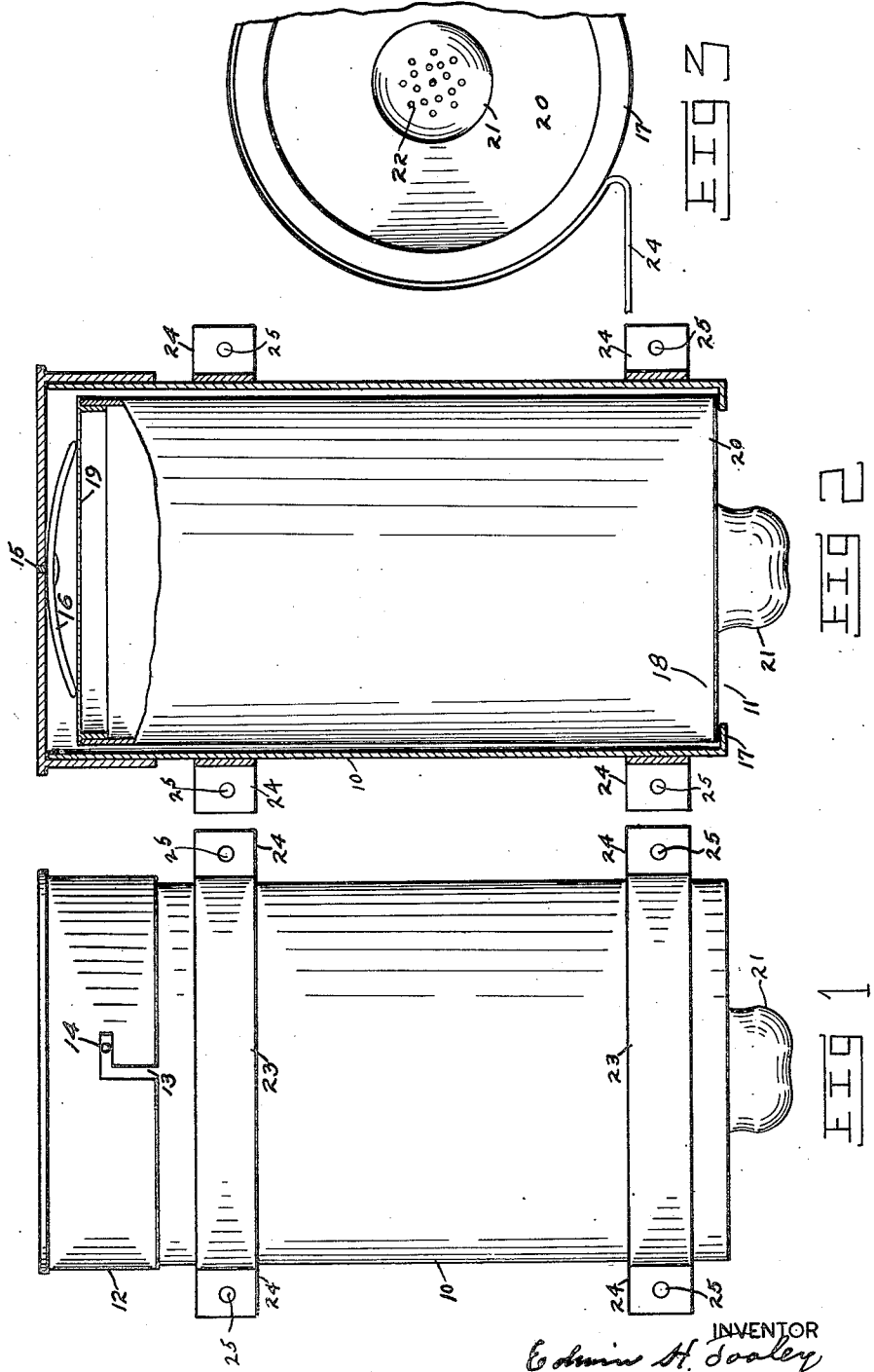

Patented July 29, 1924.

1,502,698

UNITED STATES PATENT OFFICE.

EDWIN H. TOOLEY, OF OSHAWA, ONTARIO, CANADA, ASSIGNOR TO A. L. HONEKER, OF WALLACE, IDAHO.

POWDER DISPENSER.

Application filed April 21, 1921. Serial No. 463,157.

*To all whom it may concern:*

Be it known that I, EDWIN H. TOOLEY, a subject of the British Empire, residing at Oshawa, Ontario, Canada, have invented new and useful Improvements in Powder Dispensers, of which the following is a specification.

This invention pertains to powder dispensers and has for its object to provide a receptacle adapted to contain powdered substances of various varieties, from which receptacles the contents is easily and conveniently dispensed.

A special object of the invention is to provide a receptacle of the character named, adapted to contain talcum powder and to be permanently and rigidly secured in convenient locations in billiard and pool halls and so constructed and mounted that by a mere jar with the receiving hand of the operator, a suitable amount of powder will be dispensed into the hand to serve the purpose of powdering the hands.

The device will be hereinafter particularly described, illustrated in the accompanying drawings and pointed out in the claims. In the accompanying drawings forming a part of this specification, Figure 1 is a side elevation of the device complete. Figure 2 is a broken-away vertical sectional view of the same and Figure 3 is a broken-away view of the dispensing end of the device. In a detail description, in which like numerals refer to like parts throughout the several views, an outer casing 10, open at the bottom 11 is provided with a removable cover 12, the cover 12 being made secure to the casing 10 by means of a groove 13 and pin 14 connection as shown in Figure 1. Secured to the inside of the cover 12, as by a rivet 15, is a spring 16. Around the opening 11 of the casing 10 is an annular flange 17. Mounted in the casing 10 is a cylinder 18, having a removable cover 19. The bottom 20 of the cylinder 18 is closed and is provided with a central protruding portion 21 having perforations 22 therethrough. A pair of brackets 23 engage the outer surface of the casing 10, having extensions 24 through which are openings 25 for screws or the like as a means of securing the device in a rigid manner to a permanent fixture. In the practical application of the device, the cover 12 is removed from the casing 10, the cylinder 18 drawn out, the cover 19 of the cylinder 18 removed and the cylinder 18 filled with the powder. The cover 19 is then replaced, the cylinder 18 replaced in the casing 10, the cover 12 secured to the casing 10 and after the device has been secured to its desired location the same is ready for use. In order to draw from the contents of the device, strike upwardly with the palm of the hand against the protruding portion 21. This forces the cylinder 18 upwardly against the spring 16. The spring 16 forces the cylinder 18 downwardly against the annular flange 17, giving a jar to the cylinder 18, and by means of such jar a suitable amount of the contents of the cylinder 18 is thrown into the palm of the hand.

What is claimed is:—

1. A powder dispenser comprising a container slidably mounted in a guide, an externally projecting perforated head to the container, a spring within the guide and bearing against one end of the container, the same being the end opposite the end having the perforated head, and an inwardly extending flange on the guide for engaging the end of the container having the perforated head.

2. A powder dispenser comprising a container slidably mounted in a guide, an externally projecting perforated head to the container, a spring within the guide bearing against one end of the container, the same being the end opposite the end having the perforated head, an inwardly extending flange on the guide for engaging the end of the container having the perforated head, and means for securing the guide in a rigid position, whereby, by a manual thrust upon the said externally projecting perforated head, the said container is forced against said spring and when released, the spring forces the container against said flange and the impact forces a portion of the contents of the container out through the said perforated head.

In testimony whereof, I affix my signature in the presence of a witness.

EDWIN H. TOOLEY.

Witness:
L. L. WESTFALL.